United States Patent
Todd et al.

(10) Patent No.: US 10,484,341 B1
(45) Date of Patent: Nov. 19, 2019

(54) DISTRIBUTED LEDGER FOR MULTI-CLOUD OPERATIONAL STATE

(71) Applicant: EMC IP Holding Company LLC, Hopkinton, MA (US)

(72) Inventors: Stephen Todd, Shrewsbury, MA (US); Brian Roche, Rockland, MA (US); Xuebin He, Framingham, MA (US); Thinh Nguyen, Stoneham, MA (US); Gary White, Jr., Medford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 15/499,224

(22) Filed: Apr. 27, 2017

(51) Int. Cl.
*H04L 29/06* (2006.01)
*G06F 8/60* (2018.01)

(52) U.S. Cl.
CPC ............ *H04L 63/0428* (2013.01); *G06F 8/60* (2013.01)

(58) Field of Classification Search
CPC ............................... H04L 63/0428; G06F 8/60
See application file for complete search history.

(56) References Cited

U.S. PATENT DOCUMENTS

| | | | |
|---|---|---|---|
| 10,068,228 B1* | 9/2018 | Winklevoss | G06Q 20/3829 |
| 2016/0321654 A1* | 11/2016 | Lesavich | G06F 21/6245 |
| 2016/0342977 A1* | 11/2016 | Lam | G06Q 20/02 |
| 2017/0085555 A1* | 3/2017 | Bisikalo | H04L 9/3236 |
| 2017/0140408 A1* | 5/2017 | Wuehler | G06Q 30/0207 |
| 2017/0236123 A1* | 8/2017 | Ali | G06Q 20/401 705/75 |
| 2017/0243209 A1* | 8/2017 | Johnsrud | G06Q 20/40 |
| 2017/0243212 A1* | 8/2017 | Castinado | G06Q 20/401 |
| 2017/0250972 A1* | 8/2017 | Ronda | H04L 9/08 |
| 2017/0279818 A1* | 9/2017 | Milazzo | H04L 63/1416 |
| 2017/0286717 A1* | 10/2017 | Khi | H04L 63/06 |
| 2018/0020324 A1* | 1/2018 | Beauford | H04W 4/021 |
| 2018/0089644 A1* | 3/2018 | Chen | G06Q 20/10 |
| 2018/0114205 A1* | 4/2018 | Thomas | G06Q 40/02 |

(Continued)

OTHER PUBLICATIONS

Bosh, "bosh| (/)," https://bosh.io/docs/monitoring.html, Apr. 20, 2017, 2 pages.

(Continued)

*Primary Examiner* — Techane Gergiso
(74) *Attorney, Agent, or Firm* — Ryan, Mason & Lewis, LLP (57) ABSTRACT

An apparatus comprises at least one processing device having a processor coupled to a memory. The processing device is configured to implement a first ledger node of a first cloud. The first ledger node of the first cloud is configured to communicate over one or more networks with a plurality of additional ledger nodes associated with respective additional clouds. The first ledger node is further configured to obtain a transaction associated with a cloud-related operational state. The first ledger node is further configured to broadcast the transaction to the additional ledger nodes. A cryptographic block characterizing at least the transaction is generated and entered into a blockchain distributed ledger collectively maintained by the first and additional ledger nodes. The first and additional ledger nodes collectively maintain the blockchain distributed ledger on a peer-to-peer basis without utilizing a centralized transaction authority.

20 Claims, 9 Drawing Sheets

(56) References Cited

U.S. PATENT DOCUMENTS

| | | | |
|---|---|---|---|
| 2018/0131716 A1* | 5/2018 | Chantz | H04L 63/1441 |
| 2018/0137306 A1* | 5/2018 | Brady | H04L 9/0643 |
| 2018/0150835 A1* | 5/2018 | Hunt | H04L 67/104 |
| 2018/0167217 A1* | 6/2018 | Brady | H04L 9/3247 |
| 2018/0189449 A1* | 7/2018 | Karumba | G16H 40/67 |
| 2018/0219883 A1* | 8/2018 | Li | H04L 63/1441 |
| 2018/0255090 A1* | 9/2018 | Kozloski | H04L 63/1433 |
| 2018/0270244 A1* | 9/2018 | Kumar | B64C 39/024 |
| 2018/0276597 A1* | 9/2018 | Fuller | G06K 7/12 |

OTHER PUBLICATIONS

Satoshi Nakamoto, "Bitcoin: A Peer-to-Peer Electronic Cash System," http://archive.org/details/BitcoinAPeer-to-PeerElectronicCashSystem, 2008, 9 pages.

\* cited by examiner

DISTRIBUTED LEDGER FOR MULTI-CLOUD OPERATIONAL STATE

FIELD

The field relates generally to information processing systems, and more particularly to information processing systems comprising cloud infrastructure.

BACKGROUND

Information processing systems today commonly implement a cloud computing paradigm. Cloud computing is a model for enabling on-demand network access to a shared pool of configurable computing resources (e.g., compute, storage, input/output, and network) that can be rapidly provisioned and released with minimal management effort or service provider interaction. A given cloud infrastructure upon which data and one or more software programs (e.g., applications, services) are hosted is typically referred to as a "cloud."

Application program ("application") deployment on such a cloud infrastructure has been substantially automated by the development and implementation of tools that employ a Platform-as-a-Service (PaaS) approach. One example of such a PaaS approach is implemented in the Cloud Foundry® product available from the Cloud Foundry Foundation, which provides application developers with the functionality of a versatile PaaS application deployment layer. One of the main benefits of the PaaS application deployment layer is that, by controlling deployment of an application to a specific platform (e.g., specific data center or cloud), the PaaS application layer abstracts the application developer away from the specific hardware architecture of the data center/cloud where the application is intended to be deployed. This increases development speed and also facilitates speed of deployment for information technology (IT) operators.

Examples of available public cloud infrastructures upon which applications associated with an enterprise can be deployed through a PaaS product such as CloudFoundry® include, but are not limited to, Amazon Web Services® (AWS), Google Compute Engine® (GCE), and Windows Azure® Services platforms.

SUMMARY

Illustrative embodiments are configured to monitor and manage operational states of respective cloud infrastructures through a peer-to-peer distributed ledger in a multi-cloud environment.

In one embodiment, an apparatus comprises at least one processing device having a processor coupled to a memory. The processing device is configured to implement a first ledger node of a first cloud. The first ledger node of the first cloud is configured to communicate over one or more networks with a plurality of additional ledger nodes associated with respective additional clouds. The first ledger node is further configured to obtain a transaction associated with a cloud-related operational state. The first ledger node is further configured to broadcast the transaction to the additional ledger nodes. A cryptographic block characterizing at least the transaction is generated and entered into a blockchain distributed ledger collectively maintained by the first and additional ledger nodes. The first and additional ledger nodes collectively maintain the blockchain distributed ledger on a peer-to-peer basis without utilizing a centralized transaction authority.

Advantageously, illustrative embodiments expand visibility into the operational state of multiple cloud application deployment software instances, as well as service events or other events that occur within the multi-cloud environment, using a peer-to-peer distributed ledger system. Various illustrative embodiments comprise multiple private clouds, multiple public clouds, and a mix of private and public clouds. Numerous alternative arrangements are possible.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, multiple data centers wherein each data center includes a cloud infrastructure hosting multiple tenants that share cloud resources.

Such systems are considered examples of what are more generally referred to herein as cloud computing environments.

Further, a multiple cloud (multi-cloud) environment is understood to be one that employs multiple clouds in a single heterogeneous network architecture. Some cloud infrastructures are within the exclusive control and management of a given enterprise, and therefore are considered "private clouds." The term "enterprise" as used herein is intended to be broadly construed, and may comprise, for example, a business or any other entity, group, or organization. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds). As illustratively used herein, "application" or "services" generally refer to one or more software programs designed to perform one or more functions.

As mentioned above, examples of available public cloud infrastructures upon which applications associated with an enterprise can be deployed through a PaaS product such as Cloud Foundry® include, but are not limited to, Amazon Web Services® (AWS), Google Compute Engine® (GCE), and Windows Azure® Services platforms.

Application deployment via PaaS tools (more generally, "cloud application deployment software"), such as Cloud Foundry®, typically limit the deployment of an application to a specific cloud. A typical cloud selection process for deploying an application, illustrated using Cloud Foundry® as an example, is as follows:
 1—deploy <my cloud>
 2—target <my cloud>
 3—push <my app>
 4—bind <my services>
 5—instances <my app>+100
 6—add capacity <my cloud>

In this example, the data center operator that manages the cloud infrastructure issues commands 1 and 6 of the process, while the application developer (e.g., IT personnel for a given enterprise) issues commands 2 through 5. Thus, as is evident, the application developer is automatically assigned a cloud ("my cloud") which is some portion of the cloud infrastructure that constitutes a data center. The application developer can specify services that the application will need as well as how many instances of the application will run on the assigned cloud. The data center operator then issues commands to add resource capacity to the assigned cloud and to deploy the application instance(s) to the assigned cloud for execution.

It is to be appreciated that the phrases "cloud infrastructure environment" or "cloud computing environment" as illustratively used herein generally refers to an information processing system that comprises cloud infrastructure and a platform stack used for development, management, and deployment of applications hosted by computing resources that are part of the cloud infrastructure. The cloud infrastructure in one embodiment comprises an infrastructure-as-a-service (IaaS) approach with a plurality of clouds that form a plurality of data centers (e.g., software defined data centers or SDDCs). The platform stack in one embodiment comprises development and management layers that form a programming environment for an application developer, and a PaaS deployment layer to deploy developed applications.

Figure 1:
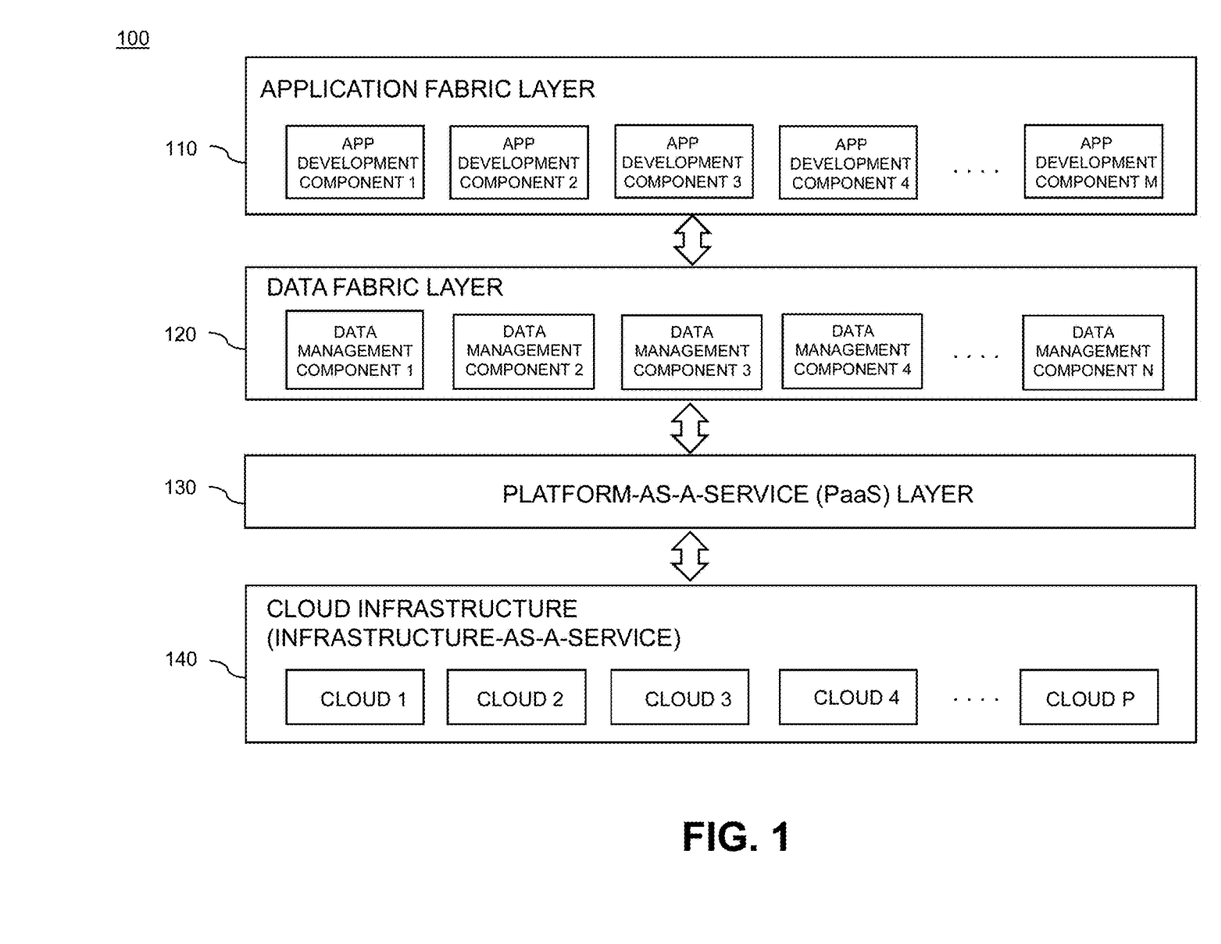
FIG. 1 is a block diagram of a platform stack in a cloud infrastructure environment with cloud application deployment functionality with which one or more embodiments of the invention can be implemented.

FIG. 1 illustrates one example of a platform stack in a cloud infrastructure environment with PaaS functionality with which one or more embodiments of the invention can be implemented. As shown, system 100 comprises an application fabric layer 110 with a plurality of application development components 1, 2, 3, 4, . . . M, a data fabric layer 120 with a plurality of data management components 1, 2, 3, 4, . . . N, a PaaS layer 130, and a cloud infrastructure 140 which utilizes an IaaS approach including a plurality of SDDCs 1, 2, 3, 4, . . . P. Each SDDC may comprise one or more clouds, each cloud having its own underlying infrastructure (by way of example only, networks, servers, storage devices, virtualization functionality including virtual machines and logical storage units, etc.).

As is known, while the PaaS layer controls deployment of an application to a specific platform (e.g., specific data center or cloud) and thus abstracts the application developer away from the underlying infrastructure of the data center/cloud where the application is to be deployed, IaaS can be used in illustrative embodiments to assist in selecting the underlying infrastructure.

It is to be appreciated that the application development components in the application fabric layer 110 may comprise any known application development tools depending on the specific applications to be developed and hosted on the data center. By way of example only, these application development tools may include one or more of: mobile software development tools from Xtreme Labs® (part of Pivotal Software, Inc. of Palo Alto, Calif.); open source web application framework Rails® (David Heinemeier Hansson); Java Virtual Machine (JVM) based application development Spring® tools (Pivotal Software, Inc. of Palo Alto, Calif.); data intensive real-time application development system Node.js® (Joyent, Inc. of San Francisco, Calif.); and cloud application vFabric® platform (VMware, Inc. of Palo Alto, Calif.), just to name a few.

Likewise, the data management components in the data fabric layer 120 may comprise any known data management tools depending on the specific applications to be developed and hosted on a data center/cloud. By way of example only, these data management tools may include one or more of: massively parallel processing (MPP) structured query language (SQL) database Pivotal HD® (Pivotal Software, Inc. of Palo Alto, Calif.); query interface software HAWQ® (Pivotal Software, Inc. of Palo Alto, Calif.); and data management software GemFire® (Pivotal Software, Inc. of Palo Alto, Calif.), just to name a few.

The PaaS layer 130 may comprise any known PaaS tool, by way of example as mentioned above, Cloud Foundry®. Another non-limiting example of a Paas tool is OpenShift® (Red Hat, Inc. of Raleigh, N.C.). One or more other PaaS tools may be employed by the PaaS layer 130.

The cloud infrastructure layer 140, in one example, comprises a plurality of SDDCs. An SDDC is a data center where elements of the infrastructure (e.g., including networking elements, storage elements, processing elements, and security elements) are virtualized and delivered as services (e.g., IaaS) to tenants. Typically, each SDDC is implemented via a specific cloud where part or all of infrastructure associated with the cloud is allocated to one or more tenants. A "cloud" generally refers to a portion of infrastructure and associated environment that operates in accordance with a cloud computing paradigm. It is to be appreciated, however, that alternative embodiments may be implemented with other types of data centers and processing platforms.

In general, a PaaS tool such as Cloud Foundryx is designed to be employed on any IaaS cloud platform.

Specifically, with respect to Cloud Foundry®, regardless of the cloud platform, external dependencies are first set up followed by creation of a manifest to deploy a BOSH director. BOSH is a tool for release engineering, deployment, lifecycle management and monitoring of a distributed processing system such as a cloud computing infrastructure. The BOSH tool is comprised of a server component (BOSH director) and a command line interface (CLI) tool. Cloud Foundry® is then deployed on the cloud computing infrastructure and has its own CLI tool.

Figure 2:
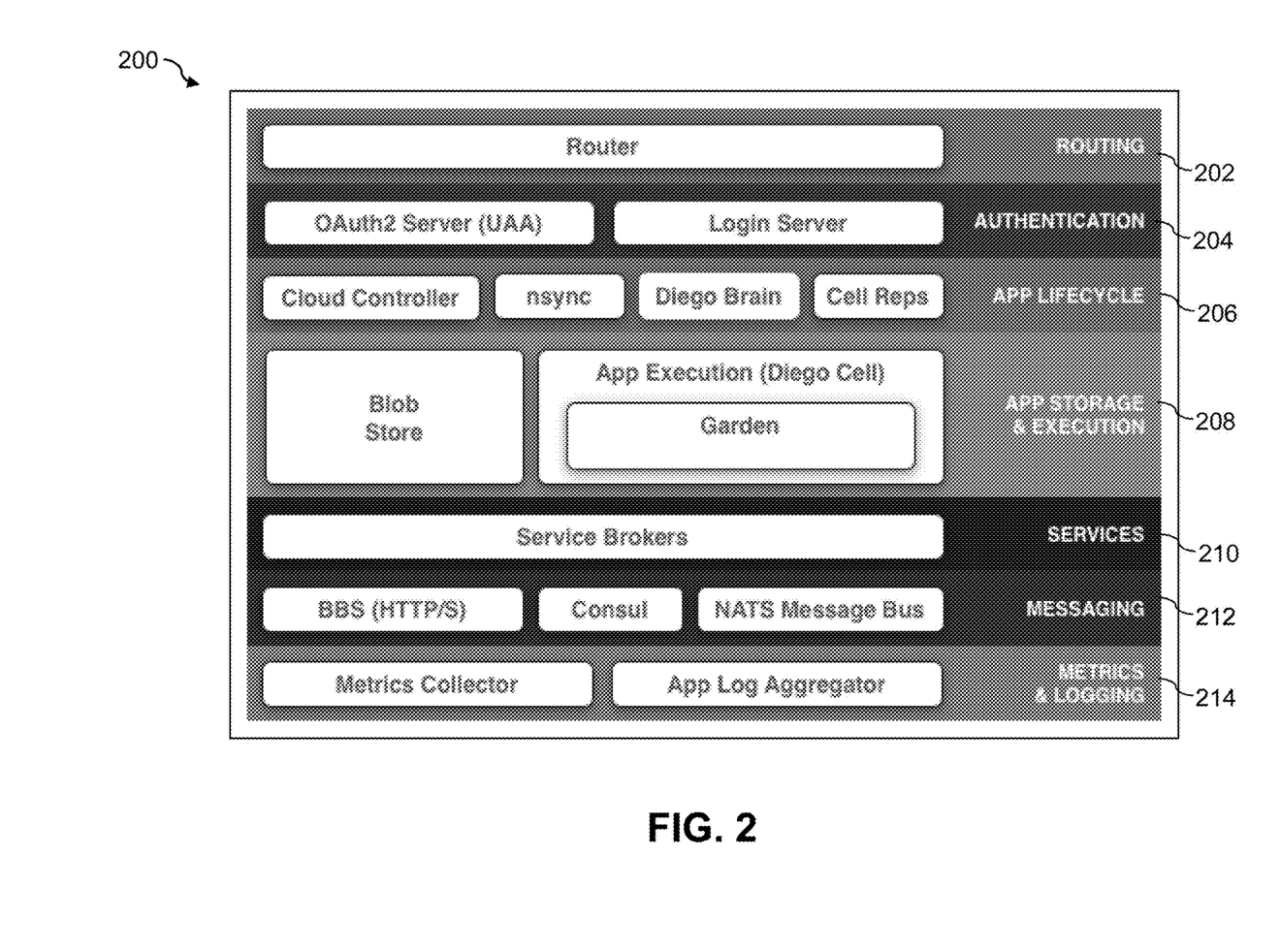
FIG. 2 is a diagram of an interface illustrating an operational environment of cloud application deployment software with which one or more embodiments of the invention can be implemented.

When Cloud Foundry® initializes in a cloud environment (e.g., AWS, GCE, Azure, etc.), its operational state is represented by a set of virtual machines (VMs). Each VM has a certain service associated therewith. FIG. 2 illustrates an operational environment of a Cloud Foundry® instantiated cloud. As shown in the operational environment interface 200, several operational features of the cloud instantiation are displayed including routing 202, authentication 204, application lifecycle 206, application storage and execution 208, services 210, messaging 212, and metrics and logging 214. As is known, Cloud Foundry® has different architectures for managing applications including the Droplet Execution Agents (DEA-based) architecture and the Diego-based architecture. These architectures may have different or similar operational functionalities which are reflected in the various fields shown in each feature (202-214) in FIG. 2. Specific details of these operational functionalities shown in FIG. 2 may be found in publicly available Cloud Foundry® documentation (docs.cloudfoundry.org) and will therefore not be further described herein.

Figure 3:
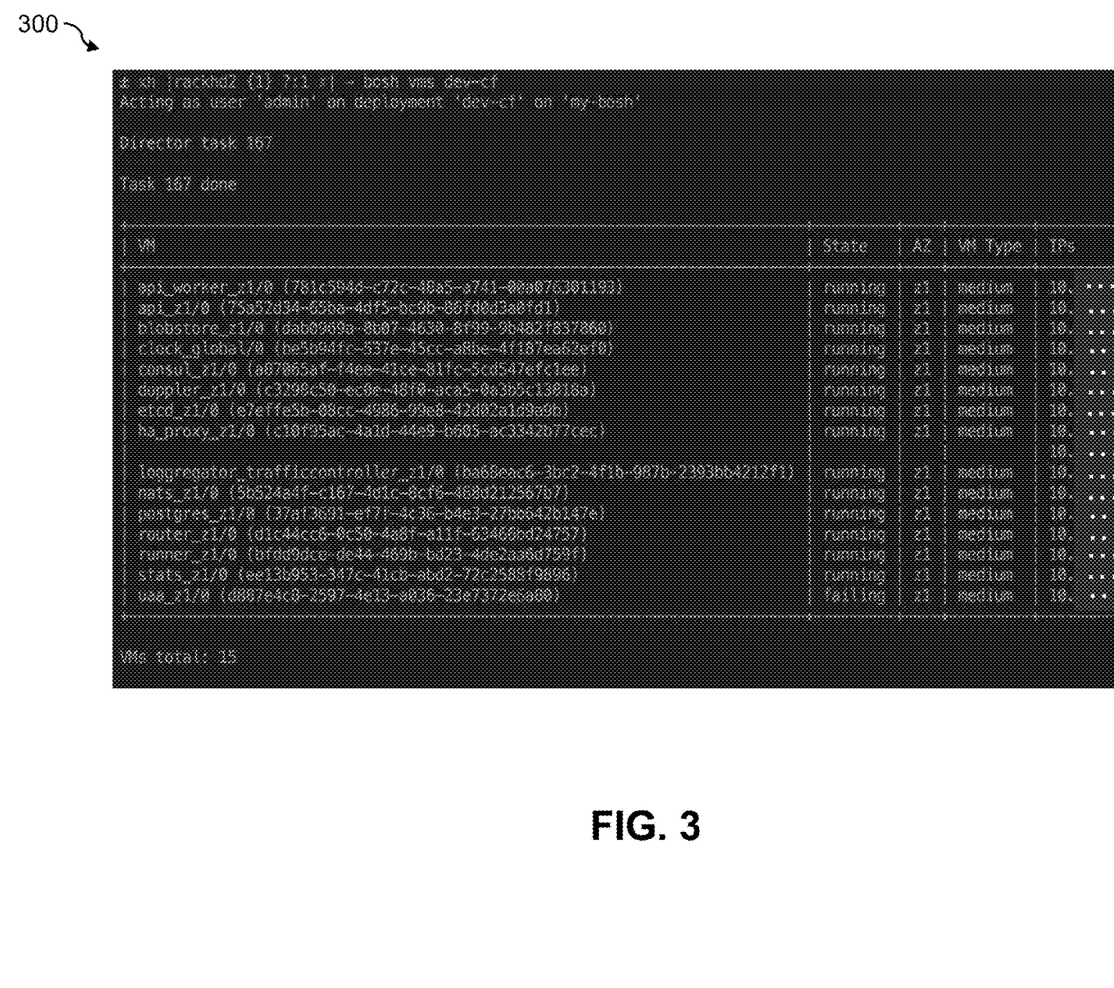
FIG. 3 is a diagram of a monitoring process output illustrating an operational state of cloud application deployment software with which one or more embodiments of the invention can be implemented.

Applications that run in the Cloud Foundryx operational environment can be locally monitored using additional Cloud Foundry® tools such as Health Monitor. The monitoring of the individual components of Cloud Foundry® itself (e.g. depicted in FIG. 2) can be accomplished locally by using the BOSH tool. FIG. 3 illustrates output 300 of a "BOSH VMs" command.

These types of tools mentioned above allow for detailed probing and understanding of the Cloud Foundry® operational environment. However, it is realized herein that the operational state of Cloud Foundry® is currently limited to the target cloud platform upon which Cloud Foundry® is running. Unfortunately, enterprises are beginning to distribute their applications and data assets across multiple cloud environments. As a result, several problems emerge as will be described below in the context of FIG. 4.

Figure 4:
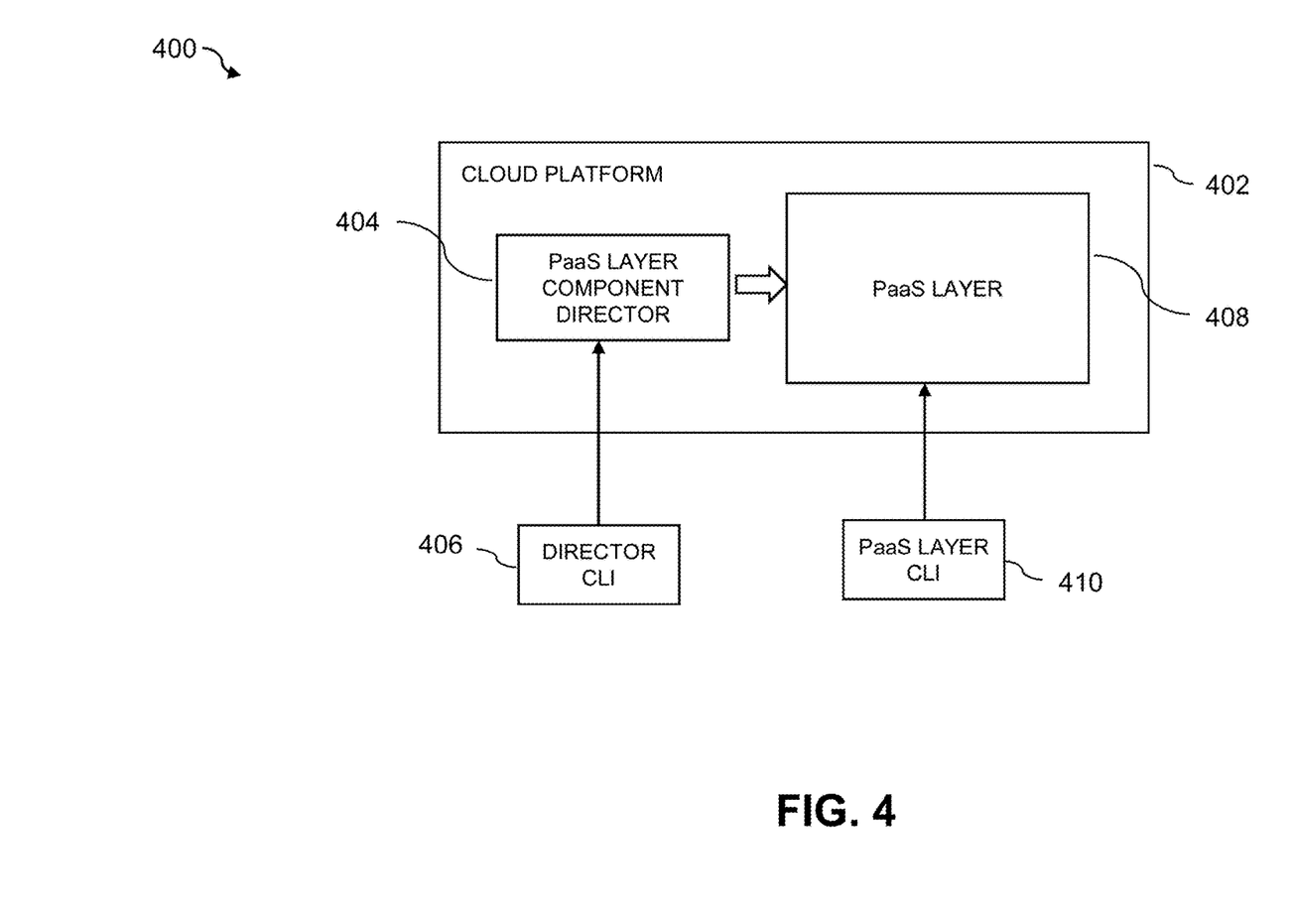
FIG. 4 is a block diagram of an information processing system illustrating access methods of an operational state of cloud application deployment software with which one or more embodiments of the invention can be implemented.

FIG. 4 illustrates common methods for accessing Cloud Foundry® operational state. As shown, information processing system 400 includes a cloud platform 402 (available from a given cloud provider, e.g., AWS). A PaaS layer component director (e.g., BOSH tool) 404 is accessed via a CLI interface 406, while a PaaS layer (Cloud Foundry®) 408 is accessed by a CLI 410. Thus, FIG. 4 depicts the capabilities for accessing Cloud Foundry® (and/or application) operational state through the use of CLI commands that can access that state. Specific details of such access commands may be found in publicly available Cloud Foundry® documentation (docs.cloudfoundry.org) and will therefore not be further described herein.

While these access methods allow a customer or an administrator to obtain a picture of the overall Cloud Foundry® operational state of a specific cloud provider (e.g., AWS), the following shortcomings are evident.

As mentioned above, Cloud Foundry® and its applications are deployed using a manifest. The manifest specifies compute resources and other application requirements. Each IaaS interprets the manifest and assigns different compute, memory, networking resources. This can lead to a delta in application performance across different IaaS platforms, and a comparison between these deltas is difficult (as will be further explained below).

The only current method to gather operational state is to point each CLI at each different instance and then aggregate the data together. This approach requires merging together the operational state manually or via a script. A variety of challenges emerge using this approach, such as synchronization of time-ordered multi-cloud events.

If a customer is using multiple clouds when running their applications, there currently is no registry which highlights which specific Cloud Foundry® instances are being run in which specific cloud service providers. This can result in a lack of awareness of all Cloud Foundry® instances that are currently being used. There is currently no method for a Cloud Foundry® instance to report to a centralized authority. Further, using BOSH or Cloud Foundry® CLIs across multiple clouds becomes problematic when trying to track and manage authentication and authorization rights.

In current methods, as the CLI gathers state from multiple Cloud Foundryx instances, it is not possible to be sure that a specific state (e.g., timestamps, CPU usage, etc.) has not been edited, hacked, or otherwise altered. This creates a scenario where it is difficult to trust the results. It is also difficult in this current environment to guarantee transactional integrity.

Given the lack of capabilities outlined above, there is also currently no user interface or dashboard to help a customer understand their overall Cloud Foundry® usage across multiple clouds. Security, transaction time, and various operational data is not available to compare and contrast across multiple clouds.

Still further, given the lack of visibility into distributed Cloud Foundry® operation, there is no ability to make decisions about how to redistribute workloads in a more cost-effective way.

Illustrative embodiments overcome the above and other drawbacks associated with current PaaS tool operational state monitoring and management mechanisms by providing a peer-to-peer distributed ledger for monitoring and managing operational state transactions in a multi-cloud environment. Such "operational state transactions" include, but are not limited to, states associated with the operations of cloud application deployment software (e.g., Cloud Foundry®), service events that occur in the multi-cloud architecture that may affect a deployed application (e.g., start/stop of a database), or any events that consume cloud resources. Thus, each of these and other transactions may be broadly referred to herein as a "transaction associated with a cloud-related operational state."

Figure 5:
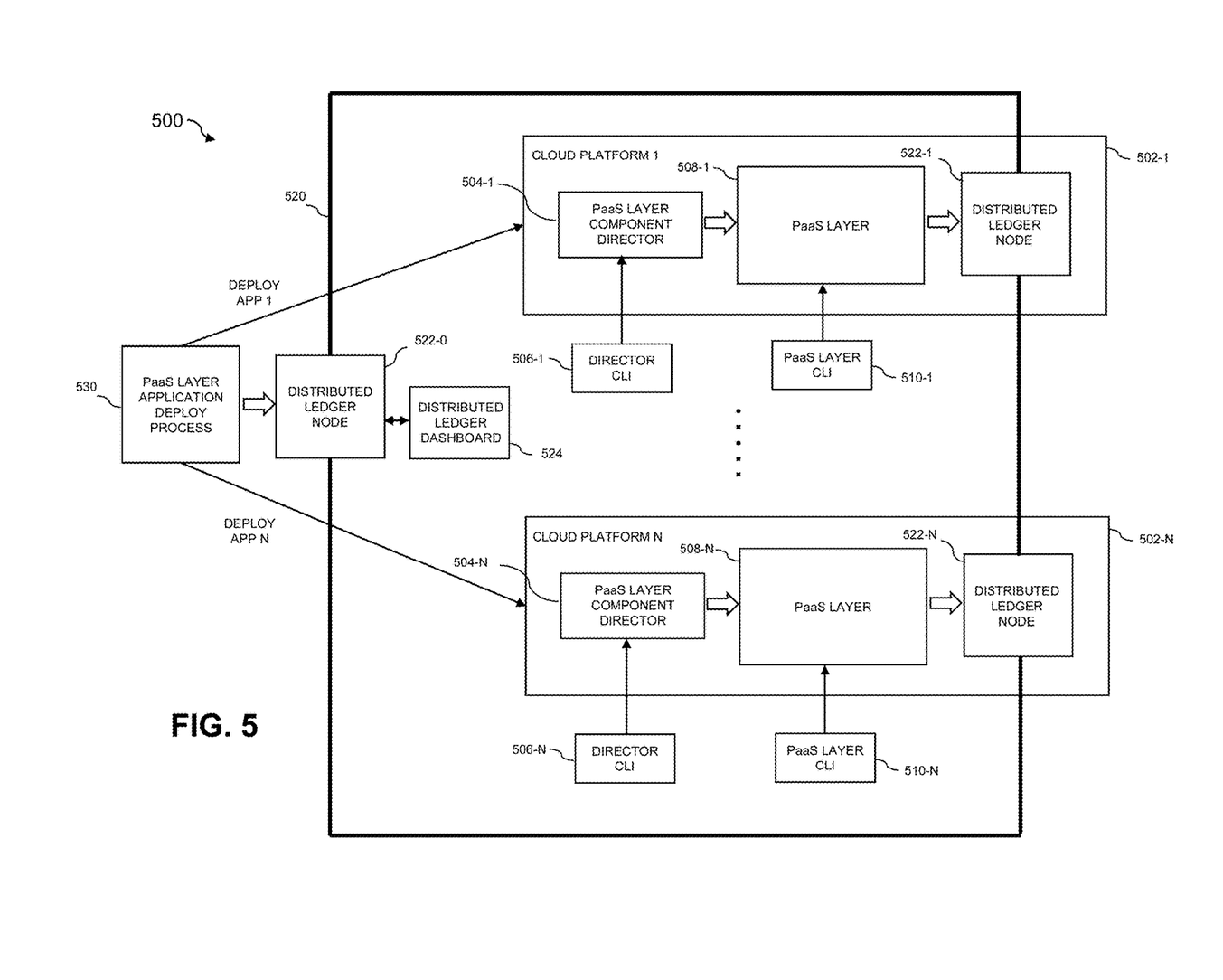
FIG. 5 is a block diagram of an information processing system comprising a peer-to-peer distributed ledger for monitoring and managing operational states of cloud application deployment software in a multi-cloud environment, according to an illustrative embodiment.

FIG. 5 illustrates an information processing system that provides such a distributed ledger system integrated into a PaaS ecosystem such as Cloud Foundry®. More particularly, FIG. 5 shows an information processing system 500 comprising a plurality of cloud platforms (clouds) 502-1, . . . . 502-N (e.g., a multi-cloud architecture), collectively referred to as clouds 502. The clouds 502 in this embodiment are assumed to be public clouds with each cloud representing a different cloud provider (e.g., AWS, GCE, Azure, etc.). The clouds 502 have respective sets of cloud resources, such as compute, storage, input/output and network resources, in various configurations. For example, an enterprise may host its data, applications, and/or services on such a multi-cloud architecture.

Similar to the individual cloud platform in FIG. 4, each cloud 502 comprises a PaaS layer component director 504

(504-1, . . . 504-N) locally accessible via a CLI interface 506 (506-1, . . . , 506-N), and a PaaS layer 508 (508-1, . . . 508-N) locally accessed by a CLI 510 (510-1, . . . 510-N). While not limited thereto, in one or more illustrative embodiments, it is assumed that the PaaS layer 508 in each cloud platform is Cloud Foundry® and the PaaS layer component director 504 is a BOSH director, each with their corresponding CLI interface.

The clouds 502 interact with one another over one or more communications networks that are not explicitly shown in order to collectively implement a peer-to-peer distributed ledger 520. In one embodiment, the distributed ledger is a blockchain, although alternative embodiments may be other types of distributed ledgers. As will be further explained below, the distributed ledger 520 is comprised of a set of operatively coupled distributed ledger nodes 522-0, 522-1, . . . 522-N, collectively referred to as ledger nodes 522. Note that distributed ledger nodes 522-1, . . . 522-N are respectively associated with clouds 502-1, . . . 502-N. Distributed ledger node 522-0 is configured the same as distributed ledger nodes 522-1, . . . 522-N but may be located local to the given enterprise that is deploying its applications on the multi-cloud architecture formed by clouds 502. However, alternative locations are possible.

In addition, a distributed ledger dashboard 524 is operatively coupled to the distributed ledger node 522-0, as well as a PaaS layer application deploy process 530. Examples of the visualizations that can be displayed to a user via dashboard 524 will be described below. PaaS layer application deploy process 530 is the process in which applications are deployed to respective public clouds. In the case of Cloud Foundry®, the deploy process 530 corresponds to the six commands (deploy <my cloud>, target <my cloud>, push <my app>, bind <my services>, instances <my app>+100, add capacity <my cloud>) described above. As shown in FIG. 5, it is assumed that APP 1 is deployed to cloud platform 502-1 and APP N is deployed to cloud platform 502-N.

Although the clouds 502 in this embodiment are illustratively implemented as respective public clouds, in other embodiments one or more of the clouds 502 may be private clouds. A wide variety of other private, public, hybrid multi-cloud arrangements can be used.

The distributed ledger nodes 522 of the respective clouds 502 are configured to communicate over the above-noted network(s) and collectively maintain the distributed ledger 520. More particularly, the ledger nodes 522 collectively maintain the distributed ledger 520 on a peer-to-peer basis without utilizing a centralized transaction authority.

The distributed ledger 520 collectively maintained by the ledger nodes 522 of the respective clouds 502 illustratively provides a first ledger system that in some embodiments is configured to interface to one or more additional ledger systems maintained by respective sets of ledger nodes associated with other cloud groupings. Each cloud grouping may have a distributed ledger gateway (not shown) that operatively couples each cloud grouping.

In operation, and as will be further illustrated in subsequent figures, ledger node 522-1 of the first cloud 502-1 generates a PaaS layer operational state transaction. The transaction can be any data associated with the operation of the PaaS layer and generally referred to herein as a "cloud application deployment operational state transaction." In one or more embodiments, this operational state is obtained by the ledger node 522-1 from the (BOSH) component director 504-1 and/or the PaaS layer (Cloud Foundry®) 508-1 deployed at cloud 502-1. By way of example in another embodiment, a daemon queries an application/service log, and detects new operational events within that log. The new operational events (more broadly, transactions associated with cloud-related operational states) are inserted into the distributed ledger 520 as described herein.

The operational state transaction is broadcast to the additional ledger nodes (522-0, . . . , 522-N, not including 522-1). A corresponding cryptographic block characterizing at least the PaaS layer operational state transaction is generated. The cryptographic block is then entered into the distributed ledger 520 collectively maintained by all the ledger nodes. For example, the cryptographic block may be entered after designated amounts of verification computations are successfully performed on that block within the ledger system. Numerous other techniques can be used to allow one or more ledger nodes or other ledger system entities to enter cryptographic blocks characterizing respective PaaS layer operational state transactions into the distributed ledger 520. Each additional ledger node (522-0, . . . , 522-N, not including 522-1) can also generate corresponding cryptographic blocks characterizing PaaS layer operational state transactions in a manner similar to that described above for ledger node 522-1. These cryptographic blocks are also entered into the distributed ledger 520 collectively maintained by the ledger nodes.

Ledger node 522-0 can obtain PaaS layer operational state transactions from the application deploy process 530 in a manner similar to that described above for ledger node 522-1. These cryptographic blocks are also entered into the distributed ledger 520 collectively maintained by the ledger nodes.

Thus, as explained above, local operational state transactions from each of the PaaS instances in clouds 502 are broadcast throughout the network to all associated permissioned ledger nodes 522, and all nodes go through the process of eventually recording the transaction in the ledger as a cryptographically generated block characterizing at least the subject transaction. In some illustrative embodiments, a cryptographic block contains more than one valuation transaction.

In the case where the distributed ledger is implemented at least in part in the form of a distributed database across a network that maintains a continuously-growing list of records more generally referred to herein as blocks, the distributed ledger is referred to as a "blockchain distributed ledger" or simply a "blockchain." Each block illustratively contains a timestamp and a link to a previous block. The blocks are generated using cryptographic techniques in order to allow each participant on the network to manipulate the blocks in a secure way without the need for a central authority.

For example, PaaS layer operational state transactions are entered as corresponding respective blocks into the blockchain distributed ledger, with each block referencing the previous block and being secured from tampering and revision through the use of designated cryptographic techniques. A given block is added to the blockchain distributed ledger only after successful cryptographic verification.

In some embodiments, any system user or other entity can verify the information in a given block by processing a signature in a block header using a public key of a corresponding account. However, only the "owner" of the corresponding account of the given block has the private key that allows full access to the block contents. The addition of new blocks to the blockchain distributed ledger may be advertised to all appropriate system entities.

The blockchain distributed ledger is illustratively configured to provide transparency and immutability of PaaS layer operational state transactions across a multi-cloud architecture in that changes to the blockchain distributed ledger are viewable by all permissioned participants and the corresponding transactions cannot be altered or deleted. Overhead costs are significantly reduced in these and other illustrative embodiments by eliminating the need for a centralized authority or other similar third party intermediary.

One or more cryptographic block techniques adapted from bitcoin implementations may be employed in some embodiments. In bitcoin, the blockchain contains a record of all previous transactions that have occurred in the bitcoin network. The growth in popularity and usage of electronic cash systems such as bitcoin is in large part due to the underlying blockchain protocol, which allows for two parties in a computer network to transact directly with each other without a trusted third party. The bitcoin system was first described in S. Nakamoto, "Bitcoin: A Peer to Peer Electronic Cash System," 2008, the disclosure of which is incorporated by reference herein in its entirety.

The clouds 502 and other clouds referred to herein are illustratively implemented by cloud infrastructure comprising one or more processing platforms. The term cloud as used herein is intended to be more broadly construed and may comprise a private cloud, a public cloud, a hybrid cloud or combinations of multiple clouds of different types.

The cloud resources implemented by the clouds 502 can include container-based compute functionality and associated storage systems. Such storage systems in some embodiments are configured to store data under the control of its associated entity and are assumed to be part of the corresponding cloud.

A given one of the clouds 502 illustratively comprises a plurality of host devices configured to support execution of applications on behalf of multiple users, although such host devices are not explicitly shown in the figure. For example, the host devices of a given one of the clouds 502 may comprise respective container host devices. Cloud native applications can execute in respective application containers implemented utilizing the container host devices. The container host devices may comprise Docker® containers, Linux® LXD containers, Cloud Foundry® Diego-based containers or other types of containers. These and other host devices are examples of what are more generally referred to herein as "processing devices."

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

A storage system of a given one of the clouds 502 illustratively includes at least one storage platform implementing one or more of block storage, object storage and file storage, although additional or alternative types of storage platforms can be used in other embodiments. The block storage may be implemented using a software-defined storage product such as ScaleIO™ to provide a virtual storage area network (vSAN). The object storage may be implemented using a cloud storage product such as Elastic Cloud Storage (ECS). The file storage may be implemented using Isilon® platform nodes and associated accelerators in the S-Series, X-Series and NL-Series product lines. The above-mentioned storage products are from Dell EMC of Hopkinton, Mass.

Different combinations of these and numerous other storage products can also be used in implementing a given storage platform in an illustrative embodiment. Additional examples of storage products that may be used in other embodiments include VNX® and Symmetrix VMAX® storage arrays, flash-based storage arrays such as DSSD™ and XtremIO™, object-based storage products such as Atmos®, and software-defined storage products such ViPR®, also from Dell EMC.

As mentioned previously, the distributed ledger 520 collectively maintained by the ledger nodes 522 of the respective clouds 502 may provide a first ledger system that is configured to interface to one or more additional ledger systems maintained by respective sets of ledger nodes associated with other cloud groupings.

The distributed ledger 520 in FIG. 5 illustrates a "hosted" ledger, as opposed to calling a centralized cloud-based blockchain application programming interface (API). Such a hosted approach has many benefits, examples of which are now described below.

Entries into distributed ledger 520 are timestamped and a checksum hash can be calculated in some embodiments. This results in the distributed ledger 520 immediately capturing state and disallows edits or tampering to occur afterwards. This provides integrity and trust of distributed PaaS (Cloud Foundry®) operational state.

Given that Cloud Foundry® operational state is continually being output into shared, distributed ledger 520, there is no need for manual (or automated) gathering and aggregation to occur. Further, as multiple instances of Cloud Foundry® store their operational state into shared distributed ledger 520, it becomes much easier to compare distributed state and examine distributed manifests (e.g., via dashboard 524).

Also, monitoring multi-cloud Cloud Foundry® operational state no longer requires managing multiple CLI accounts per cloud, but instead granting permission to access the distributed ledger 520.

Cloud Foundry® currently does not have a mechanism to be "aware" of other Cloud Foundry® instances. Similarly, there is no registry to find out which Cloud Foundry® instances are part of an enterprise configuration. The blockchain distributed ledger solution according to illustrative embodiments, where the distributed ledger nodes 522 ("blockchain peers") provide a distributed ledger to multiple Cloud Foundry® instances, solves these and other problems.

In accordance with illustrative embodiments, there are a number of ways for the blockchain peers (distributed ledger nodes 522) to be configured.

In one embodiment, a publicly accessible enterprise boot node is provided in a private cloud. For example, a customer that wishes to unite multiple Cloud Foundry® instances via a blockchain network can dedicate a server or a VM from within their private cloud to run a boot node server. Whenever a Cloud Foundry® instance starts a blockchain service, this blockchain service can communicate with this well-known port and receive a list of "peer blockchain nodes" in return.

In another embodiment, a publicly accessible boot node is deployed in a public cloud. This approach is similar to the enterprise boot node embodiment above, except the enterprise deploys a blockchain boot node in a public cloud.

In yet another embodiment, a push configuration is employed. In this embodiment, the system pushes a list of blockchain peers to every blockchain node. For example, if a customer starts a blockchain service in three different Cloud Foundry® instances (e.g., AWS, Azure, GCE), the IP addresses of each service can be "pushed" to all three nodes by a central authority (e.g. within the private data center) that keeps track of all Cloud Foundry® instances and their corresponding blockchain nodes.

In a further embodiment, peer-to-peer discovery is performed. For example, each ledger node broadcasts User Datagram Protocol (UDP) discovery requests to find other ledger nodes.

No matter which embodiment is used, the end result is a local blockchain entry point that is now part of a multi-cloud Cloud Foundry® deployment. Cloud Foundry® could potentially discover remote Cloud Foundry® instances by inspecting the distributed ledger 520 itself.

One example of how to implement the distributed ledger solution is to create a new Cloud Foundry® blockchain microservice. Below is an example of how a customer (e.g., a bank) can deploy a distributed ledger for exclusive use within their enterprise across multiple public cloud providers.

This example would run as a Cloud Foundry® service and provide a blockchain API (e.g., Representational State Transfer or REST-based) to other Cloud Foundry® components. This API would provide normalized blockchain APIs that allow for any number of blockchain implementations (e.g., Hyperledger, Microsoft Blockchain-as-a-Service, etc.).

Alternatively, an existing service (e.g., a logging service) could be modified to store some subset of log entries into a blockchain implementation. This would allow for existing Cloud Foundry® components to have their log entries stored into a distributed ledger without any code change. An existing logging service could continue to create log entries in the traditional way, but if desired, some or all of those entries could also be stored on the blockchain. Finally, the existing log could be discontinued, and the blockchain could be used as a permanent log.

Below is an example manifest with the blockchain service. Note that the example manifest code below highlights a public IP address that this Cloud Foundry® instance will join to become part of the distributed ledger. Note that the solution below uses the "boot node" embodiment described above to identify boot node peers. "CF" refers to Cloud Foundry®.

```
jobs:
  -name: cf_blockchain
    instances: 1
    resource_pool: small z1
    bootnode: [10.10.4.128]
    templates:
    -{name: blockchain, release: blockchain release}
    -{name: consul_agent, release: cf}
    -{name: metron_agent, release: cf}
  networks:
    -name: cf_private
       static ips: [10.0.16.103]
    -name: cf_public
       static ips: [152.12.12.21]
```

The existing Cloud Foundry® UAA (authentication) service could be modified to enter certain security transactions into the distributed ledger. For example, an administrator deletes a user, and a blockchain transaction is created. This permanently records the event, timestamps it, and when stored in the ledger, it is broadcast to all of the blockchain nodes (ledger nodes) that are part of the system using: url: https://blockchain.cloudfoundry.aws.com/v1 method: post
body:
{
"CFInstance": "pcfawsinstance.mycompany.com"
"sender": "uaa",
"type": "delete user",
"data": "James",
"time": "12:09:36 Jan. 1, 2017"
}

Now that all Cloud Foundry® instances in a multi-cloud deployment are directing their operational status towards a distributed ledger, a dashboard can be built on top of the ledger to give an enterprise administrator a view into the Cloud Foundry® distributed state. FIG. 5 illustrates a dashboard 524 and further highlights this approach.

Figure 6:
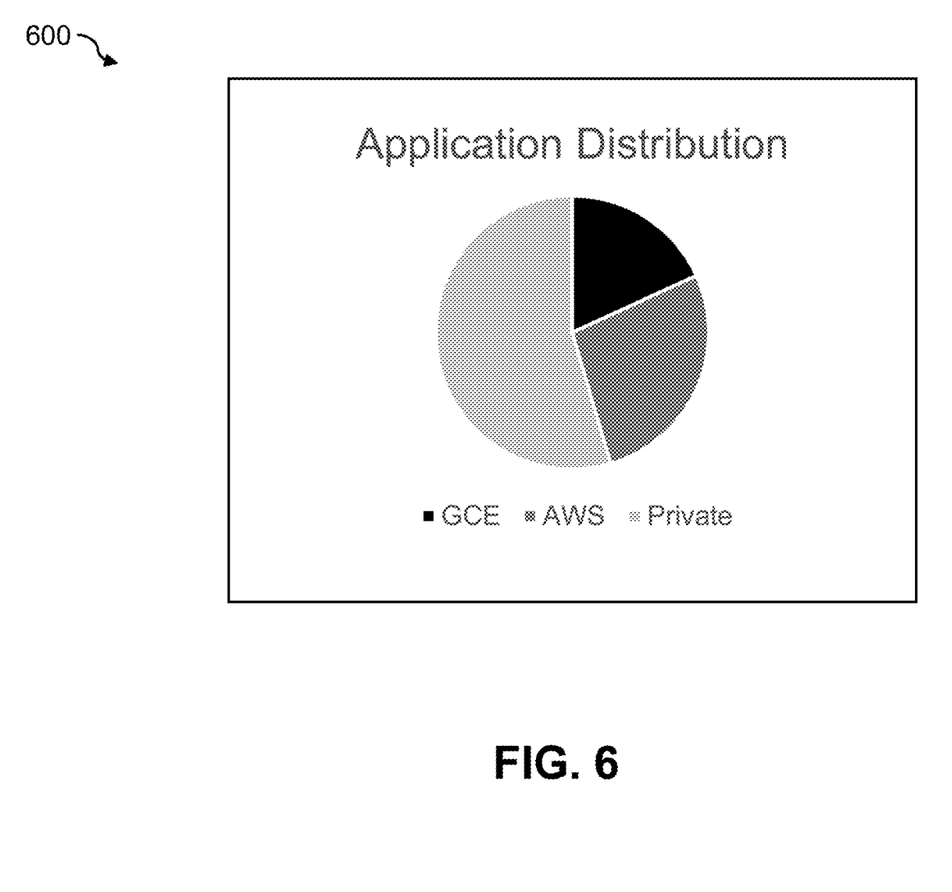
FIG. 6 is a block diagram of an exemplary visualization associated with a distributed ledger dashboard, according to an illustrative embodiment.

FIG. 6 illustrates a visualization 600 generated by one or more of the ledger nodes (or some other information processing system component) and displayed on dashboard 524 to illustrate application distribution among multiple clouds. More particularly, since embodiments enable PaaS layer operational state to be pushed down to a local ledger node, then an enterprise can examine a visualization such as that shown in FIG. 6 and determine that 60 percent of its applications are running on private clouds, 15 percent on GCE (public) clouds, and 25 percent on AWS (public) clouds. The enterprise can then determine a re-deployment plan, e.g., move more of its applications and/or data sets to more cost-effective public cloud platforms.

In additional embodiments, the distributed ledger can be programmatically queried with a script to send out alerts based on Cloud Foundry® multi-cloud state changes.

Figure 7:
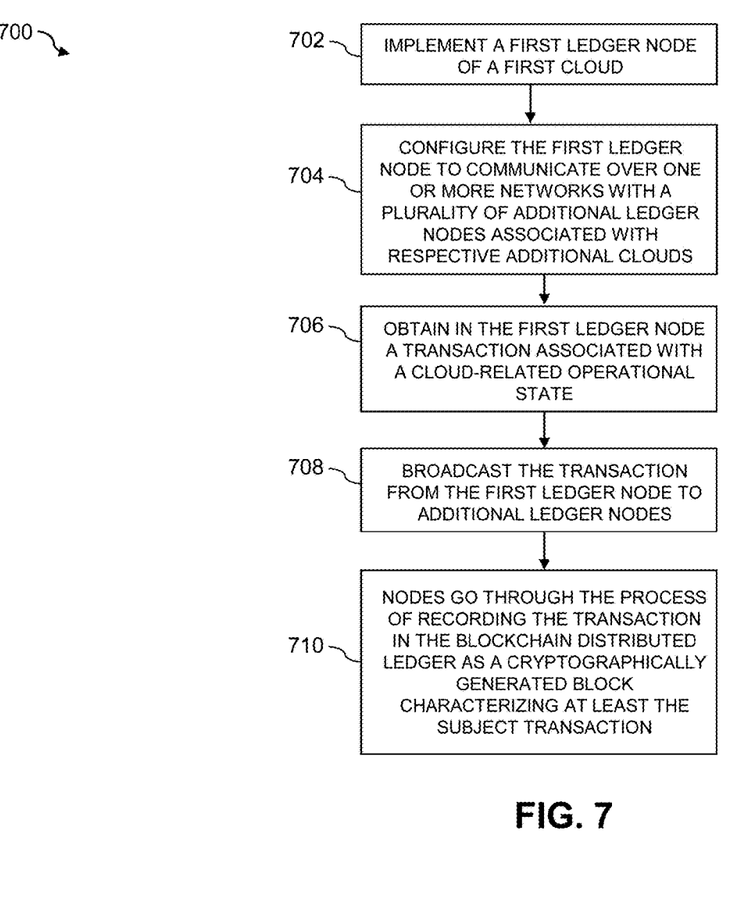
FIG. 7 illustrates a methodology for providing a peer-to-peer distributed ledger for monitoring and managing operational states of cloud application deployment software in a multi-cloud environment, according to an illustrative embodiment.

FIG. 7 illustrates a methodology 700 for providing a peer-to-peer distributed ledger for monitoring and managing operational states in a multi-cloud environment in an illustrative embodiment. As shown, in step 702, the methodology implements a first ledger node of a first cloud. In step 704, the first ledger node is configured to communicate over one or more networks with a plurality of additional ledger nodes associated with respective additional clouds. In step 706, the first ledger node obtains a transaction associated with a cloud application deployment operational state. In step 708, the transaction is broadcast to the additional ledger nodes. In step 710, the nodes go through the process of eventually recording the transaction in the ledger as a cryptographically generated block characterizing at least the subject transaction. In some illustrative embodiments, a cryptographic block contains more than one cloud application deployment operational state transaction. Thus, advantageously, the first and additional ledger nodes collectively maintain the blockchain distributed ledger on a peer-to-peer basis without utilizing a centralized transaction authority.

At least portions of the architecture of information processing systems described herein may be implemented using one or more processing platforms. Illustrative embodiments of such platforms will now be described in greater detail in conjunction with FIGS. 8 and 9. Although described primarily in the context of information processing system 500, these platforms may also be used to implement at least portions of other information processing systems in other embodiments of the invention.

Figure 8:
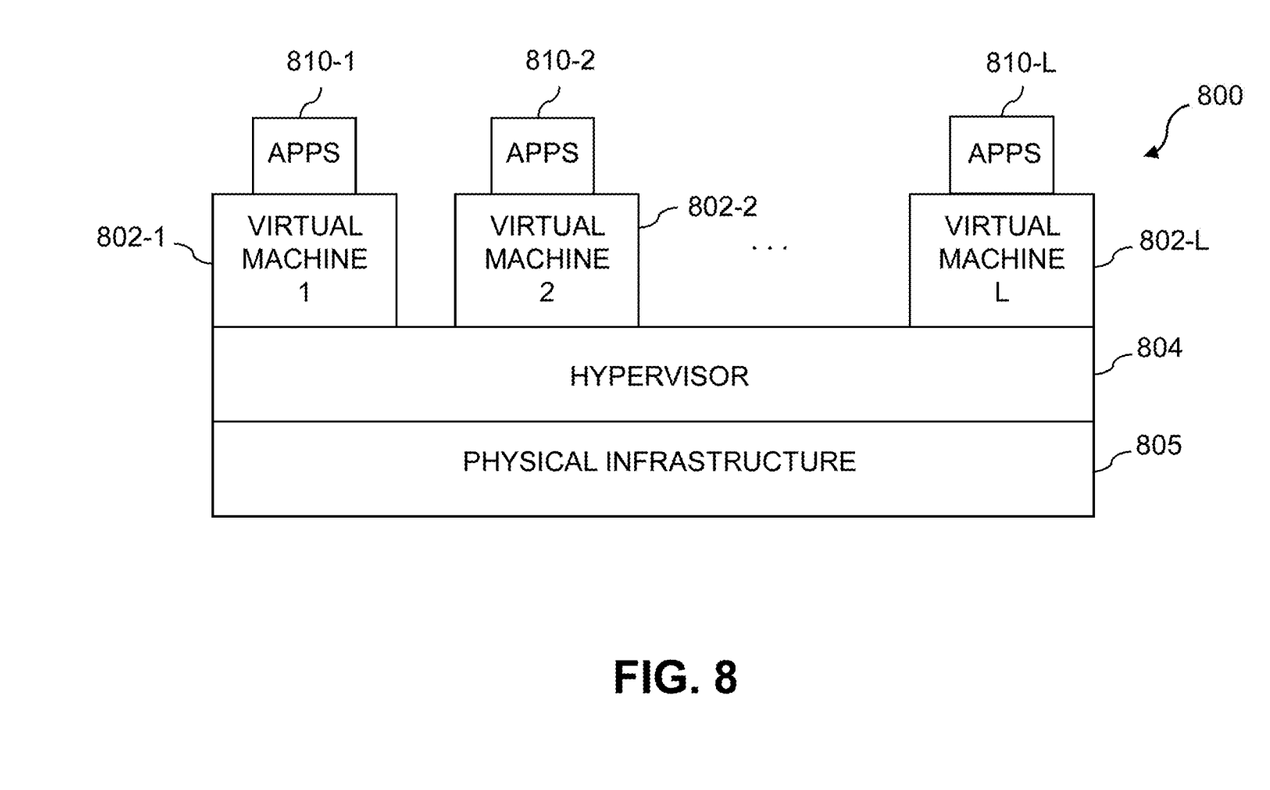
FIGS. 8 and 9 show examples of processing platforms that may be utilized to implement at least a portion of an information processing system in illustrative embodiments.

FIG. 8 shows an example processing platform comprising cloud infrastructure 800. The cloud infrastructure 800 comprises a combination of physical and virtual processing resources that may be utilized to implement at least a portion of the information processing systems described herein. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

These and other types of cloud infrastructure can be used to implement one or more system components/steps, such as the components/steps shown in previous figures.

Although only a single hypervisor 804 is shown in the embodiment of FIG. 8, the information processing systems may of course include multiple hypervisors each providing a set of virtual machines using at least one underlying physical machine. Different sets of virtual machines provided by one or more hypervisors may be utilized in configuring multiple instances of various components of the information processing systems.

An example of a commercially available hypervisor platform that may be used to implement hypervisor 804 and possibly other portions of the information processing systems in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the information processing systems.

As is apparent from the above, one or more of the processing modules or other components of the information processing systems illustrated in the figures and otherwise described above may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

Figure 9:
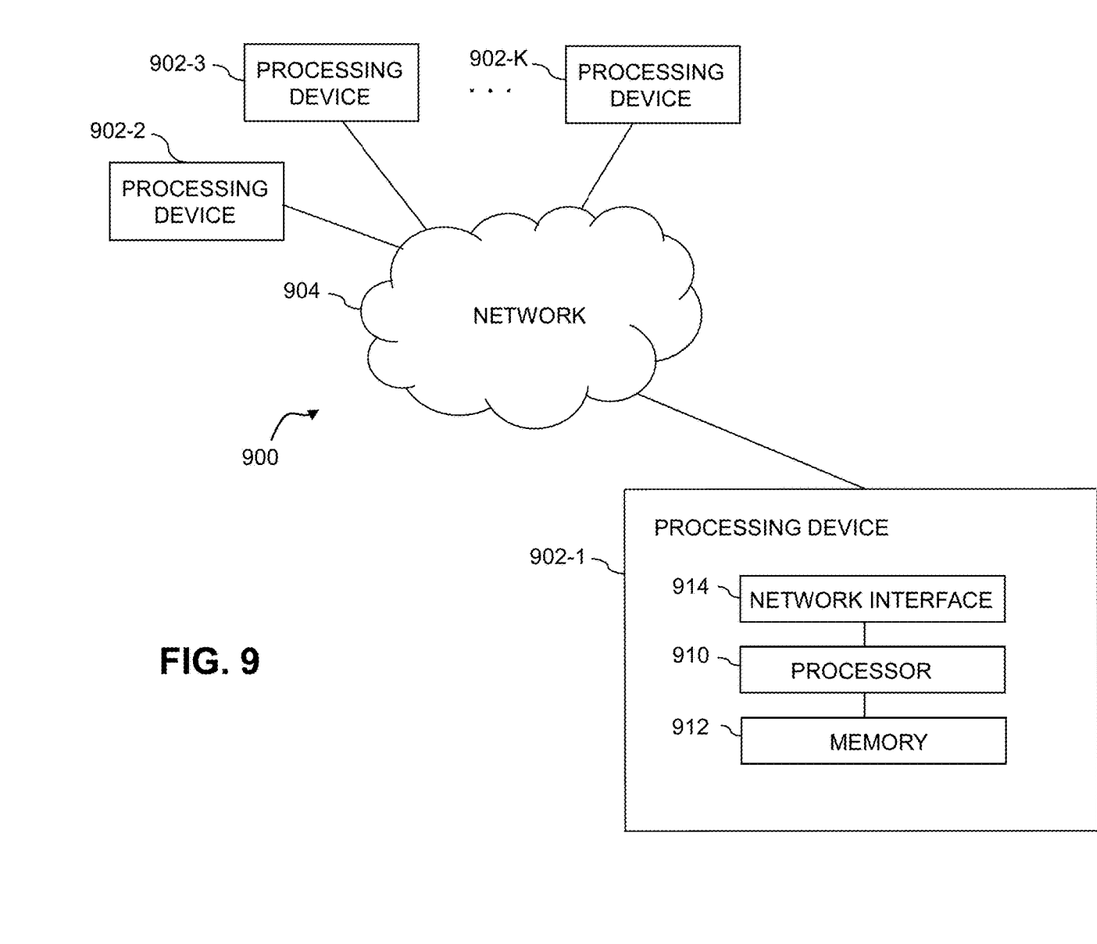

The processing platform 900 in this embodiment comprises a portion of the information processing systems and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks. Some networks utilized in a given embodiment may comprise high-speed local networks in which associated processing devices communicate with one another utilizing PCIe cards of those devices, and networking protocols such as InfiniB and, Gigabit Ethernet or Fibre Channel.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA) or other type of processing circuitry, as well as portions or combinations of such circuitry elements. The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionalities. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from Dell EMC. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing systems described herein. Such components can communicate with other elements of an information processing system over any type of network or other communication media.

As indicated previously, components of an information processing system as disclosed herein can be implemented at least in part in the form of one or more software programs stored in memory and executed by a processor of a processing device. For example, at least portions of ledger nodes, a blockchain distributed ledger, clouds, PaaS tools, algorithms, dashboards, directors, CLI interfaces, monitor processes, APIs, or other component of an information processing system are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   wherein the processing device is configured to implement a first ledger node of a first cloud;
   the first ledger node of the first cloud being configured to:
   communicate over one or more networks with a plurality of additional ledger nodes associated with respective additional clouds;
   obtain a transaction associated with a cloud-related operational state, wherein the cloud-related operational state comprises status information associated within the deployment of a given application on the first cloud; and
   broadcast the transaction to the additional ledger nodes;
   wherein a cryptographic block characterizing at least the transaction is generated and entered into a blockchain distributed ledger collectively maintained by the first and additional ledger nodes; and
   wherein the transaction is obtained from cloud application deployment software instantiated on the first cloud.

2. The apparatus of claim 1, wherein at least a subset of the first and additional clouds comprise respective public clouds.

3. The apparatus of claim 1, wherein at least a subset of the first and additional clouds comprise respective private clouds.

4. The apparatus of claim 1, wherein the cloud application deployment software is configured to operate as a platform-as-a-service layer.

5. The apparatus of claim 1, wherein the transaction is time stamped and a checksum hash function applied thereto in generating the cryptographic block.

6. The apparatus of claim 1, wherein the blockchain distributed ledger maintains an automatic aggregation of cloud application deployment operational states from the first and additional clouds.

7. The apparatus of claim 1, wherein the blockchain distributed ledger enables comparison of cloud-related operational states from the first and additional clouds.

8. The apparatus of claim 1, wherein the blockchain distributed ledger enables secure access to command line interfaces for the first and additional clouds.

9. The apparatus of claim 1, wherein the blockchain distributed ledger enables a determination of a distribution of multiple applications of a given enterprise across the first and additional clouds.

10. The apparatus of claim 9, wherein the distribution of multiple applications of the given enterprise is presented on a dashboard associated with the blockchain distributed ledger.

11. The apparatus of claim 9 wherein the distribution is representative of a percentage of the applications running on each of the first and additional clouds.

12. The apparatus of claim 1, wherein one or more of the first and additional ledger nodes are configured to operate in at least one of a public cloud environment or a private cloud environment or combinations thereof.

13. The apparatus of claim 1, wherein each one of the first and additional ledger nodes is configured to receive a network address associated with each of the other of the first and additional ledger nodes.

14. The apparatus of claim 1, wherein the blockchain distributed ledger enables a blockchain service accessible by cloud application deployment software components, instantiated on the first and additional clouds, through a blockchain application programming interface (API).

15. The apparatus of claim 14, wherein one or more of the cloud application deployment software components store log entries in the blockchain distributed ledger via the blockchain API.

16. The apparatus of claim 1, wherein the transaction comprises one or more operational events that occur with respect to one or more of the first and additional clouds.

17. The apparatus of claim 1, wherein the first and additional ledger nodes collectively maintain the blockchain distributed ledger on a peer-to-peer basis without utilizing a centralized transaction authority.

18. A method comprising:

implementing a first ledger node of a first cloud;

configuring the first ledger node to communicate over one or more networks with a plurality of additional ledger nodes associated with respective additional clouds;

obtaining in the first ledger node a transaction associated with a cloud-related operational state, wherein the cloud-related operational state comprises status information associated within the deployment of a given application on the first cloud; and broadcasting the transaction to the additional ledger nodes;

wherein a cryptographic block characterizing at least the transaction is generated and entered into a blockchain distributed ledger collectively maintained by the first and additional ledger nodes;

wherein the transaction is obtained from cloud application deployment software instantiated on the first cloud; and the method being performed by at least one processing device comprising a processor coupled to a memory.

19. A computer program product comprising a non-transitory processor-readable storage medium having stored therein program code of one or more software programs, wherein the program code when executed by at least one processing device comprising a processor coupled to a memory causes the processing device to:

implement a first ledger node of a first cloud;

configure the first ledger node to communicate over one or more networks with a plurality of additional ledger nodes associated with respective additional clouds;

obtain in the first ledger node a transaction associated with a cloud-related operational state, wherein the cloud-related operational state comprises status information associated within the deployment of a given application on the first cloud; and broadcast the transaction to the additional ledger nodes;

wherein a cryptographic block characterizing at least the transaction is generated and entered into a blockchain distributed ledger collectively maintained by the first and additional ledger nodes; and wherein the transaction is obtained from cloud application deployment software instantiated on the first cloud.

20. The computer program product of claim 19 wherein the program code when executed by at least one processing device comprising a processor coupled to a memory causes the processing device to perform at least one of:

maintain, with the blockchain distributed ledger, an automatic aggregation of cloud application deployment operational states from the first and additional clouds; or enable, with the blockchain distributed ledger, a comparison of cloud-related operational states from the first and additional clouds.

\* \* \* \* \*